(12) United States Patent
Martin et al.

(10) Patent No.: US 8,527,156 B2
(45) Date of Patent: Sep. 3, 2013

(54) TRACTOR-IMPLEMENT CONTROL SYSTEM METHOD

(75) Inventors: Michael Jonathan Martin, Waterloo, IA (US); Timothy Joel Kilworth, Waverly, IA (US); Peter Muench, Schifferstadt (DE); Benjamin Neermann, Mannheim (DE); Bruce Craig Newendorp, Cedar Falls, IA (US); Travis James Davis, Cedar Falls, IA (US)

(73) Assignee: Deere & Company, One John Deere Place, Moline, IL (US)

( * ) Notice: Subject to any disclaimer, the term of this patent is extended or adjusted under 35 U.S.C. 154(b) by 597 days.

(21) Appl. No.: 12/613,814

(22) Filed: Nov. 6, 2009

(65) Prior Publication Data

US 2011/0112729 A1 May 12, 2011

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ........... 701/50; 701/1; 701/36; 701/116; 701/117; 56/10.1; 56/10.2 R; 56/14.7; 414/24.5; 414/111

(58) Field of Classification Search
USPC ........... 701/50, 1, 23, 24, 36, 45, 46, 48, 701/49, 70, 116, 117; 56/10.1, 10.2 R, 10.3, 56/10.5, 14.7; 100/4, 5, 7, 43; 53/52, 77, 53/64, 502, 503, 504, 587; 414/24.5, 111
See application file for complete search history.

(56) References Cited

U.S. PATENT DOCUMENTS

2001/0018821 A1* 9/2001 Chow .............................. 53/589
2002/0082757 A1* 6/2002 Behnke ........................... 701/50
(Continued)

FOREIGN PATENT DOCUMENTS

EP  1813145  8/2007
EP  2052598  4/2009

OTHER PUBLICATIONS

European Search Report received Feb. 7, 2011 (4 pages).

*Primary Examiner* — Thomas H. Tarcza
*Assistant Examiner* — Rami Khatib

(57) ABSTRACT

A tractor comprises a tractor frame, driven ground engaging means, and an electronic tractor controller. A baler comprises a baler frame coupled or connected to the tractor frame, a crop receiving means, a baling chamber, a bale size sensor associated with the baling chamber, and an electronic baler controller. The baler controller is operable to submit a halt signal to the tractor controller when a bale size signal provided by the bale size sensor indicates that a bale has reached a size equal to or exceeding a first predetermined size. A control method includes the baler controller generating a tractor halt signal in response to certain conditions of the baler system and the tractor controller preventing tractor motion in response to the halt signal. The method also includes, when the baler controller is generating the halt signal, enabling motion of the tractor if the operator issues a command for the tractor to move by manipulating the command device, and within a certain time period of said command being issued, the baler controller generates a tractor motion enabling signal in response to a status of the baler system. The method further includes, when the baler controller is generating the halt signal, enabling motion of the tractor if the operator moves the tractor command device in a special manner.

3 Claims, 3 Drawing Sheets

(56) References Cited

U.S. PATENT DOCUMENTS

| | | | |
|---|---|---|---|
| 2007/0175198 A1* | 8/2007 | Viaud et al. ................. 56/341 |
| 2008/0224445 A1* | 9/2008 | Viaud et al. ................. 280/442 |
| 2009/0107102 A1 | 4/2009 | Biziorek |

* cited by examiner

TRACTOR-IMPLEMENT CONTROL SYSTEM METHOD

FIELD OF THE INVENTION

The present invention relates to a method of controlling a tractor-implement combination.

BACKGROUND OF THE INVENTION

Agricultural tractors are used in combination with implements which are towed by the tractor. A tractor/baler combination is used in agriculture to take up crop lying or standing on a field and to press and bind it to a bale. A tractor/baler combination with automatically controlled operations is described in U.S. Pat. No. 7,404,355, issued in July 2008 and assigned to the assignee of the present application.

When a tractor is pulling a round baler through a field it is necessary to keep the tractor stationary while the bale is ejected and the gate or rear door is closed. Many times an operator will re-initiate motion before the gate is fully closed and latched. This can prevent the cycle from completing successfully. With a baler, material may get caught in the gate and prevent it from fully closing. This results in lost time while the gate is reopened, the debris is removed, and the gate is closed again. Also, if the bale ejection cycle is initiated before the bale is fully wrapped, the bale may unwrap after the ejection resulting in either loss of the material or loss of time to re-bale the material.

With an automated system, the machine can determine when it is appropriate to move on to the next step of the operation. For example, eject the bale and/or re-initiate motion once the bale has been ejected. The automated system thereby provides additional opportunities to ensure that the operation is completed successfully in the correct order. In the case of ejecting a bale prematurely, the automated system can initiate this only after the bale wrapping process has been completed. For the case of re-initiating motion before the bale ejection cycle is complete, it can prevent the tractor from moving even if the operator attempts to start motion. It is not always feasible for an automated system to fully encompass all of the many exceptions to the "normal" field operation/sequences. For these cases, it would be desirable to provide the operator a relatively simple way to override the mistake proofing features.

SUMMARY OF THE INVENTION

Accordingly, an object of this invention is to provide an improved method of controlling a tractor-implement combination.

A further object of the invention is to provide the operator with a relatively simple way to override the mistake proofing features of a tractor-implement automatic control system.

These and other objects are achieved by the present invention, wherein a method is provided for controlling a combination of a tractor and an implement, such as a baler, coupled to the tractor. The tractor includes ground engaging drive wheels driven by an engine which is coupled to the drive wheels by a power transmission, an operator movable command device and a tractor controller operable to control tractor motion in response to operation of the command device. The baler includes a baler system for receiving crop, for baling crop into a bale and for ejecting a bale from the baler, a baler controller coupled to the baler system and to the tractor controller. The method includes the baler controller generating a tractor halt signal in response to certain conditions of the baler system and the tractor controller preventing tractor motion in response to the halt signal. The method also includes, when the baler controller is generating the halt signal, enabling motion of the tractor if the operator issues a command for the tractor to move by manipulating the command device, and within a certain time period of said command being issued, the baler controller generates a tractor motion enabling signal in response a status of the baler system.

The method further includes, when the baler controller is generating the halt signal, enabling motion of the tractor if the operator issues a command for the tractor to move by manipulating the command device, and within a certain time period after said command being issued, the baler controller generates a tractor motion enabling signal in response a status of the baler system.

The method also includes, when the baler controller is generating the halt signal, enabling motion of the tractor if the operator issues a command for the tractor to move by manipulating the command device, and within a certain time period before said command being issued, the baler controller generates a tractor motion enabling signal in response a status of the baler system.

The method further includes when the baler controller is generating the halt signal, enabling motion of the tractor if the operator moves the tractor command device in a special manner.

The automated system provides several opportunities to prevent operator mistakes during normal operation. The operator still has the possibility to override the automation system using the normal controls in an intuitive manner.

DESCRIPTION OF THE PREFERRED EMBODIMENT

Figure 1:
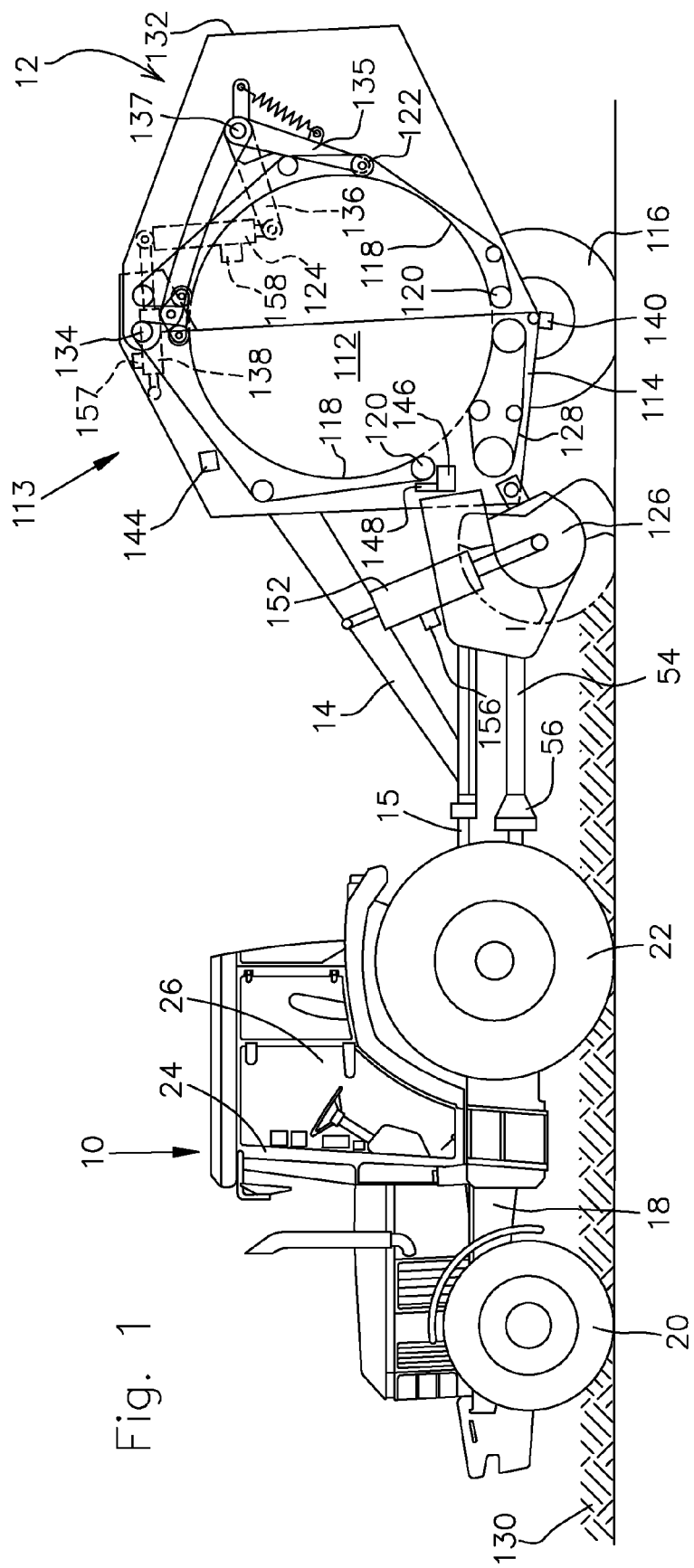
FIG. 1 is a simplified side view of a tractor with a round baler coupled thereto.

FIG. 1 shows a tractor 10 and a round baler 12 coupled to a tractor drawbar 15 by means of a baler drawbar 14. The tractor 10 is supported on a frame 18, which is supported on ground engaging steerable front wheels 20 and ground engaging driven rear wheels 22. The frame 18 supports a cab 24 which includes an operator's station 26. The tractor 10 includes a conventional power take-off or PTO shaft 56 which is connected to a drive shaft 54 of the baler 12.

The baler 12 includes a baler frame 114 supported on wheels 116. The frame 114 supports a baler system 113 which includes a baling chamber 112 surrounded by aprons 118 guided around rollers 120. An arm 135 supporting a roller 122 can be moved upwardly and downwardly by means of a hydraulic cylinder 124. The hydraulic cylinder 124 is connected to the arm 135 via a lever 136 that is pivotally about a horizontal axis 137. The hydraulic cylinder 124 thus determines the tension of the aprons 118. Below the front edge of the baler 12, a crop receiving pickup 126 with tines moving or rotating around a transverse axis is followed in a crop flow direction by a conveyor belt 128. The conveyor belt 128 could also be replaced by a rotor (not shown), or a rotor could be inserted in the crop flow direction between the crop receiving means and the conveyor belt 128. Instead of the pickup, any other suitable crop receiving means could be used, like mowing and conveying units. The crop receiving means 126 collects crop lying in a swath 130 of grass, hay or straw on the field and feeds it into the baling chamber 112. The aprons 118 define a baling chamber 112 of a variable size. The aprons 118 are set into motion in their longitudinal direction during a baling process, since one or more of the rollers 120 is rotatively driven. The crop introduced into the baling chamber 112 is thus also rotating during baling, while the size of the baling chamber 112 increases over time since the bale causes arm 135 to move downwardly against the force of the cylinder 124.

A rear door 132 is pivotally mounted to an upper rear location of the frame 114 at an axis 134 extending transversely to the forward direction of the tractor 10 and the baler 12. A door actuator 138 in the form of a hydraulic cylinder is mounted with one end to the frame 114 and with a second end to the rear door 132. The rear door 132 supports the rollers 120 surrounding the rear part of the baling chamber 112. Actuator 138 is connected to the rear door 132 such that it can pivot the rear door 132 upwardly (in FIG. 1 counter-clockwise) around axis 134 to be able to eject a bale from the baling chamber 112.

A rear door sensor 140 is mounted at the lower rear end of the baler frame 114 close to the lower front edge of the rear door 132. Sensor 140 senses whether the rear door 132 is closed or not by means of a switch (not shown) actuated by the rear door 132.

Three bale size sensors 144 connected to the baler processor 110 are distributed over the width of the baling chamber 112. They sense the distance to the surface of the bale and/or of aprons 118 abutting the bale surface and provide thus information about the bale diameter at their respective location along the width of the bale. A first one of the bale size sensors 144 is assigned to a position close to the left edge of the baling chamber 112. A second one of the bale size sensors 144 is assigned to a position close to center of the baling chamber 112. A third one of the bale size sensors 144 is assigned to a position close to the right edge of the baling chamber 112.

A wrapping material dispenser 146 is located close to the baling chamber 112. It is connected to the baler controller 110 and dispenses, once instructed so by the baler controller 110, a wrapping material like twine, ribbon, net or wrapping sheet to the baling chamber 112. The rotating bale catches or pulls the wrapping material such that it is then wrapped around the bale. A wrapping material movement sensor 148 is interacting with the wrapping material dispenser 146 and senses whether the bale is pulling the wrapping.

The crop receiving means 126 can be lifted by a hydraulic cylinder 152. Sensors 156 and 158 provide information about the position of the cylinders 152, 124, respectively to the baler controller 110. Another sensor 157 senses the position of the door actuator 138 or of the gate or door 132.

Figure 2:
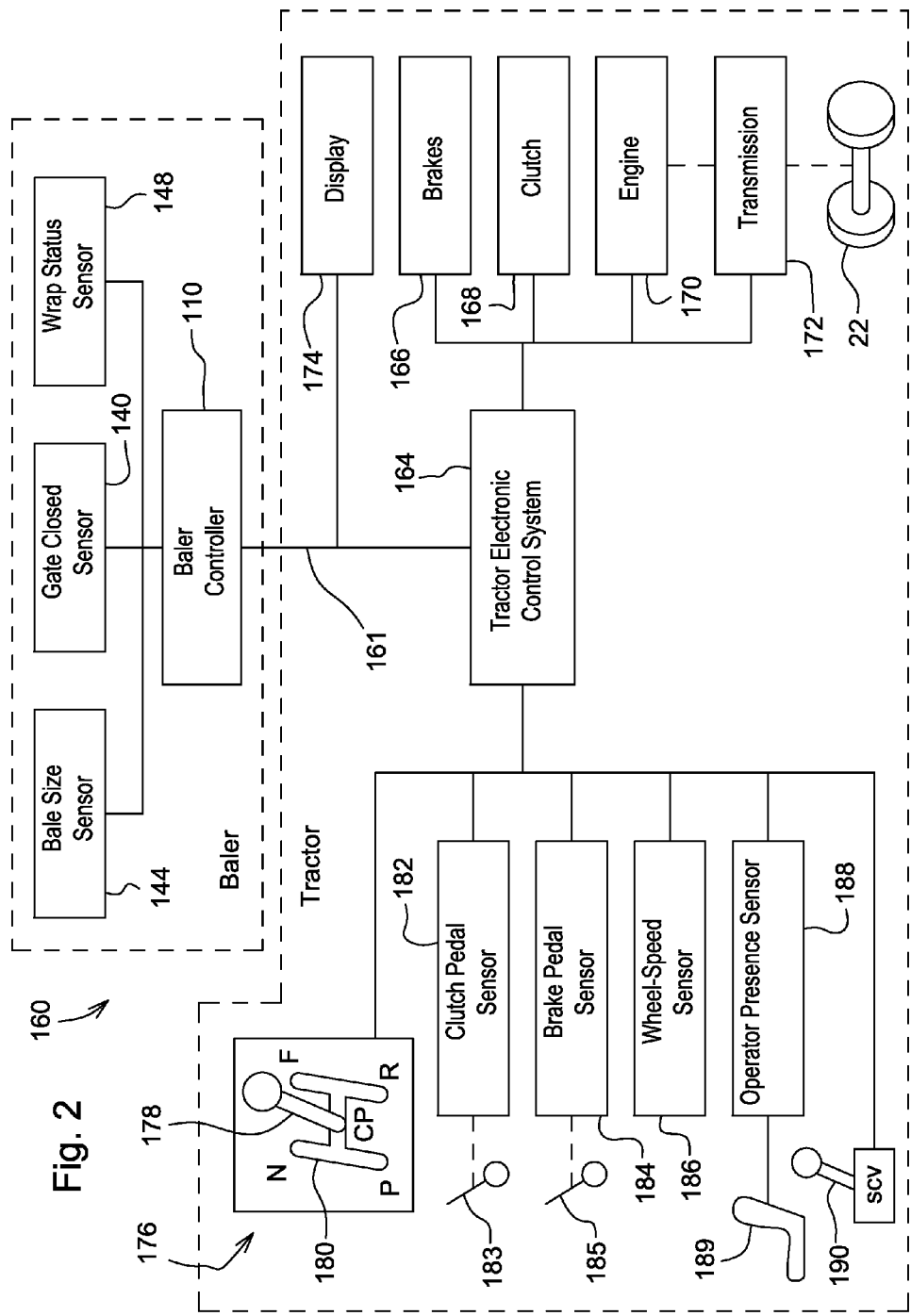
FIG. 2 is schematic diagram of a control system the tractor/baler combination of FIG. 1.

Referring now to FIG. 2, the tractor baler control system 160 includes an electronic microprocessor-based baler control unit 162 which is mounted on the baler 12 and which is connected to bale size sensors 144, to gate closed sensor 140 and to wrap sensor 148. Control unit 162 is connected via a convention data bus 161, such as a CAN bus, to a tractor electronic control system 164.

The tractor electronic control system 164 preferably includes one or more conventional microprocessor-based electronic control units (not shown) which control various tractor systems and components, such as, but not limited to, the brakes 166, the clutch 168, the engine 170 and the transmission 172. The engine 170 drives the transmission 172 which drives the wheels 22.

The transmission 172 is preferably a known infinitely variable transmission or IVT. The transmission 172 could be a known power shift transmission (not shown), or any other type of commercially available transmission suitable for use in a tractor. For example, the transmission 172 can, for example, be a purely hydraulic transmission with a hydraulic pump driven the clutch 168 and a hydraulic motor or hydrostatic transmission (not shown) moving the wheels 22, wherein the transmission ratio of the gear can be changed by adjusting the swash plates (not shown) of the pump (not shown) and/or of the motor (not shown). Alternatively, the transmission could be a multistage mechanical gearbox with a torque converter (not shown) connected in series, such as used in passenger cars, or a mechanical gearbox (not shown) with a sufficient number of transmission stages and an automatically switched clutch (not shown) or planet gears (not shown) and friction clutches (not shown). Alternatively, the transmission 172 could be have step-less adjustable gearing, such as V-belts (not shown) that rotate around pulleys (not shown) with adjustable diameters, or with a mechanical and a hydraulic (or electrical) drive path, wherein a planetary transmission (not shown) comprises an element driven mechanically with a fixed or stepwise variable speed and one driven hydraulically or electrically with variable speed, and the third element (not shown) is used for output. A combination of several of the mentioned transmissions would also be conceivable.

An interface/display unit 174 is connected to the control system 164 through the CAN bus 161. The control system 164 receives transmission command signals from a known direction reverser control 176 which has a control lever or command device 178 movable in a "H" shaped gate or slot 180 to neutral N, center park CP, park P, forward F and reverse R positions. The control system 164 also receives signals from a clutch pedal sensor 182 coupled to clutch pedal 183, a brake pedal sensor 184 coupled to brake pedal 185, a wheel speed sensor 186, an operator presence sensor 188 coupled to seat 189, and a selective control valve (SCV) unit 190. The SCV unit 190 can be manipulated by the operator to control functions on the baler, such as the rear door or gate 132.

Figure 3:
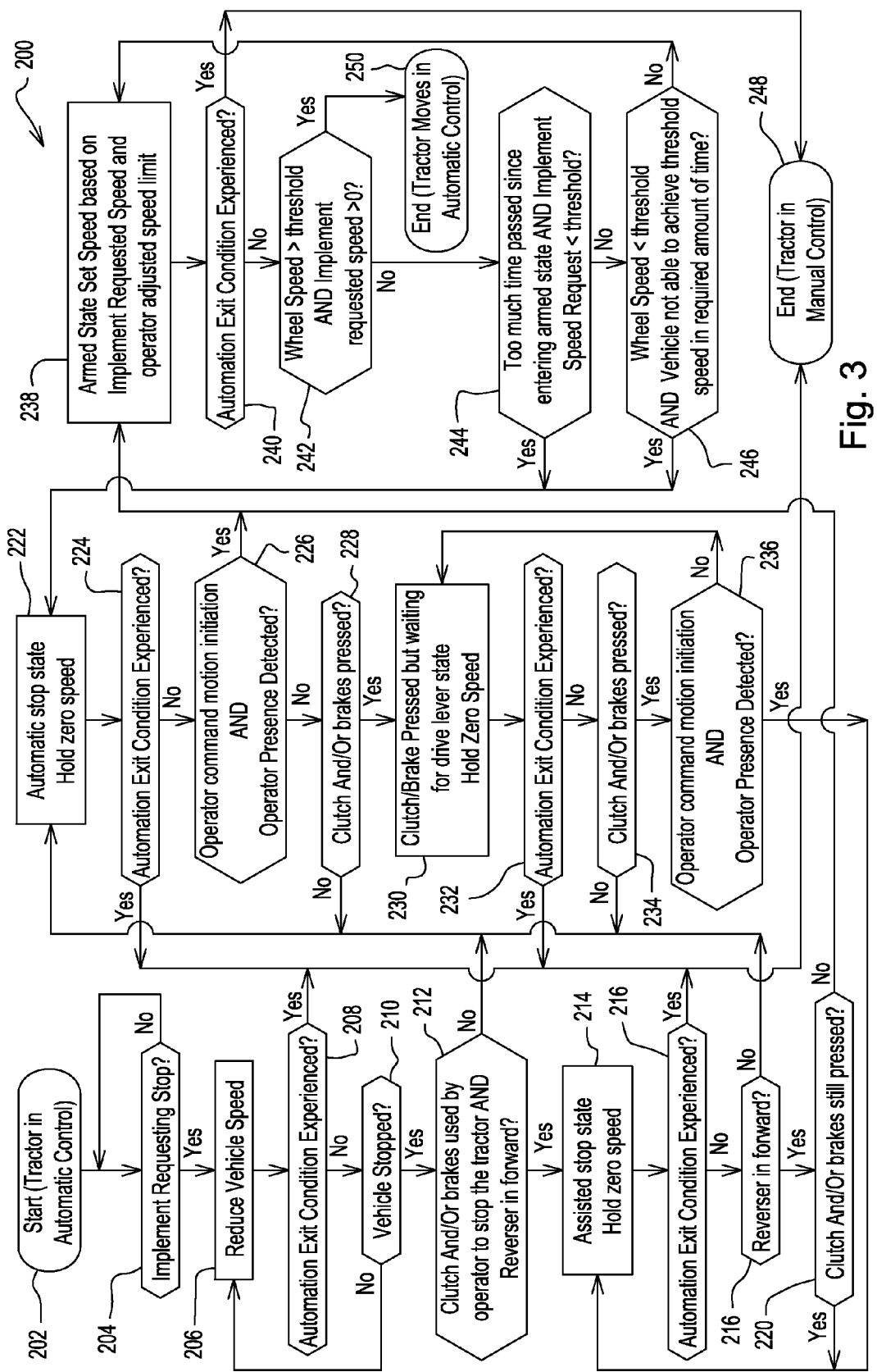
FIG. 3 is a logic flow diagram of an algorithm executed by the control system of FIG. 2.

Referring now to the flow chart of FIG. 3, the controller system 164 executes an algorithm 200. The conversion of the above flow chart into a standard language for implementing the algorithm described by the flow chart in a digital computer or microprocessor, will be evident to one with ordinary skill in the art.

The algorithm begins at step 202 when the tractor control system is in an automatic mode.

Step 204 directs control to step 206 if the baler controller 162 has requested stopping of the tractor or has issued a halt signal, else step 204 repeats.

Step 206 generates a reduce speed command that causes the control system 164 to slow down the tractor and directs control to step 208.

Step 208 directs control to step 248 if an automation exit condition exists, else to step 210. An automation exit condition can exist for a variety of reasons, such as when the operator generates an override command, the operator is out of the seat, there is a system fault, there is a loss of communication in the system, etc.

Step 210 directs control to step 212 if the tractor has stopped, else back to step 206.

Step 212 directs control to step 214 if the clutch or brakes have been used to stop the tractor 10 and the reverser lever 178 is in its forward position, else to step 222.

Step 214 generates a hold zero speed command and directs control to step 216.

Step 216 directs control to step 248 if an automation exit condition exists, else to step 218.

Step 218 directs control to step 220 if the reverser lever 178 is in its forward position, else to step 222.

Step 220 directs control to step 214 if the clutch and/or the brakes are still pressed, else to step 238.

Step 222 establishes an "automatic stop state" and generates a hold zero speed command and directs control to step 224.

Step 224 directs control to step 248 if an automation exit condition exists, else to step 226.

Step 226 directs control to step 238 if the operator commands tractor motion and operator presence is detected by sensor 188, else to step 228.

Step 228 directs control to step 230 if the clutch and/or the brakes are still pressed, else to step 222.

Step 230 generates a hold zero speed command and directs control to step 232.

Step 232 directs control to step 248 if an automation exit condition exists, else to step 234.

Step 234 directs control to step 236 if the clutch and/or the brakes are still pressed, else to step 222.

Step 236 directs control to step 214 if the operator commands tractor motion and operator presence is detected by sensor 188, else to step 238.

Step 238 establishes an armed state, and sets the tractor speed based on the speed requested by the baler 12 and an operator adjusted speed limit (set how?) and directs control to step 240. Typically, the operator sets the speed limit with the traditional operator controls. The speed limit is the speed that the tractor would be going if it were in manual control.

Step 240 directs control to step 248 if an automation exit condition exists, else to step 242.

Step 242 directs control to step 250 if the tractor wheel speed is greater than a threshold (such as 0.5 kph, for example) and the speed requested by the baler is greater than zero, else to step 244.

Step 244 directs control to step 222 if more than a certain time period (such as 1 second) has expired since step 238 was executed and the speed requested by the baler 12 is less than a threshold (such as 0.5 kph, for example), else to step 246.

Step 246 directs control to step 222 if the tractor wheel speed is less than a threshold (such as 0.5 kph, for example) and the tractor has been unable to reach the threshold speed within a certain time period (such as 0.5 seconds), else to step 238.

Step 248 ends automatic control of the tractor 10 so that the operator can manually control the tractor speed with the reverser lever 178.

Step 250 ends this subroutine and the tractor 10 is allowed to move under automatic control.

As a result, the algorithm 200 operates to perform the following method. The baler controller 162 generates a tractor halt signal in response to certain conditions of the baler system 113, such as when the gate 132 is open, and the tractor control system 164 prevents tractor motion in response to the halt signal. When the baler controller 162 is generating the halt signal, the tractor control system 164 enables motion of the tractor 10 if the operator issues a command for the tractor to move by manipulating the command device 178, and within a certain time period, before or after, of the command being issued, the baler controller 162 generates a tractor motion enabling signal in response a status of the baler system 113.

With this method the tractor 10 remains stationary while the implement 12 is requesting zero (0) speed. Once the implement 12 requests non-zero speed, the operator must move the reverser lever 178 from center park to forward to re-initiate forward motion. If the operator does this before the implement 12 requests a non-zero speed, motion will not be initiated and the reverser lever 178 must be cycled again after the implement 12 requests a non-zero speed. If the operator feels it is necessary to begin moving before the implement 12 is ready, the reverser lever 178 can be moved to a position other than forward or center park (e.g. reverse, neutral, or corner park) and the tractor 10 will respond to this and subsequent commands (exits automation). This differs from the use of the SCV lever 190 because moving the reverser lever 178 between forward and center park is part of the "normal" behavior to re-initiate forward motion. In addition, if the brake 166 and/or clutch 168 were activated during stopping, releasing them will result in the same behavior as moving the reverser lever 178 from center park to forward. When the capability is provided by the transmission 172, it will go to powered zero while stopped. When this capability is not available, the transmission 172 will go to neutral during stop and to park if the clutch 168 is released prematurely.

While the present invention has been described in conjunction with a specific embodiment, it is understood that many alternatives, modifications and variations will be apparent to those skilled in the art in light of the foregoing description. For example, the invention would be applicable to a tractor-implement combination where the implement is an implement other than a baler. The invention would also be applicable to a tractor in combination with any type of auxiliary control unit, such as a GPS unit or a guidance system, which can be connected to the tractor control system and which can cause the tractor control system to stop the tractor under certain conditions. Accordingly, this invention is intended to embrace all such alternatives, modifications and variations which fall within the spirit and scope of the appended claims.

We claim:

1. A method of controlling a combination of a tractor and an implement coupled to the tractor, the tractor including ground engaging drive wheels driven by an engine which is coupled to the drive wheels by a power transmission, an operator movable command device and tractor controller operable to control tractor motion in response to operation of the command device, the command device having neutral, park, center park, forward and reverse positions, the implement including a implement system for performing a function, and an implement controller coupled to the implement system and to the tractor controller, the method comprising:

holding the tractor stationary while the implement controller requests zero tractor speed;

when the implement controller requests a non-zero tractor speed, re-initiating forward motion of the tractor if the command device is moved from the center park position to the forward position;

if the operator moves the command device from the center park position to the forward position before the implement controller requests a non-zero speed, preventing tractor motion until the command device is cycled again after the implement controller requests a non-zero speed; and enabling tractor motion before the implement controller is ready if the operator moves the command device to a position other than forward or center park.

2. The method of claim 1, wherein:
the implement comprises a baler having a baler system; and
the implement controller comprises a baler controller which controls the baler system.

3. The method of claim 2, wherein:
when the baler controller is generating the halt signal, enabling motion of the tractor if the operator issues a command for the tractor to move by manipulating the command device, and within a certain time period before said command being issued, the baler controller generates a tractor motion enabling signal in response to a status of the baler system.

\* \* \* \* \*